(12) United States Patent
McIntosh et al.

(10) Patent No.: US 9,906,602 B1
(45) Date of Patent: *Feb. 27, 2018

(54) SYSTEM AND METHOD FOR GENERATING PERSONALIZED SHORT LINKS AND MONITORING ACTIVITY

(71) Applicant: salesforce.com, inc., San Francisco, CA (US)

(72) Inventors: Jim McIntosh, McCordsville, IN (US); James Michael Ciancio-Bunch, Indianapolis, IN (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,068

(22) Filed: Nov. 14, 2016

Related U.S. Application Data

(63) Continuation of application No. 14/958,473, filed on Dec. 3, 2015, now Pat. No. 9,497,278, which is a continuation of application No. 14/054,285, filed on Oct. 15, 2013, now Pat. No. 9,210,229.

(60) Provisional application No. 61/714,086, filed on Oct. 15, 2012.

(51) Int. Cl.
*G06F 15/173* (2006.01)
*H04L 29/08* (2006.01)

(52) U.S. Cl.
CPC ............ *H04L 67/146* (2013.01); *H04L 67/02* (2013.01); *H04L 67/22* (2013.01)

(58) Field of Classification Search
USPC ................ 709/204, 217, 218, 219, 224, 227
See application file for complete search history.

(56) References Cited

U.S. PATENT DOCUMENTS

| | | | | |
|---|---|---|---|---|
| 2002/0104026 A1* | 8/2002 | Barra | ..................... | H04L 51/30 726/5 |
| 2004/0215479 A1* | 10/2004 | Dorsey | ................ | G06Q 10/107 709/206 |
| 2012/0078782 A1* | 3/2012 | Schoenberg | ......... | G06Q 20/102 705/40 |
| 2013/0159507 A1* | 6/2013 | Mason | ................... | G06Q 30/02 709/224 |
| 2013/0159826 A1* | 6/2013 | Mason | .............. | G06F 17/30873 715/205 |
| 2013/0262653 A1* | 10/2013 | Qu | ..................... | G06Q 30/0277 709/224 |
| 2013/0282714 A1* | 10/2013 | Lathrom | ........... | G06F 17/30876 707/736 |

* cited by examiner

*Primary Examiner* — Liangche A Wang
(74) *Attorney, Agent, or Firm* — Morris & Kamlay LLP

(57) ABSTRACT

A computerized method and system to generate individualized shortened URLs and track user activity is disclosed. A method includes generating an individualized shortened URLs for each of a plurality of recipients, sending communications to each of the plurality of recipients, wherein each of the communications includes the individualized shortened URL, receiving a request from at least one of the plurality of recipients for the individualized shortened URL, and referring the request to a destination URL.

9 Claims, 5 Drawing Sheets

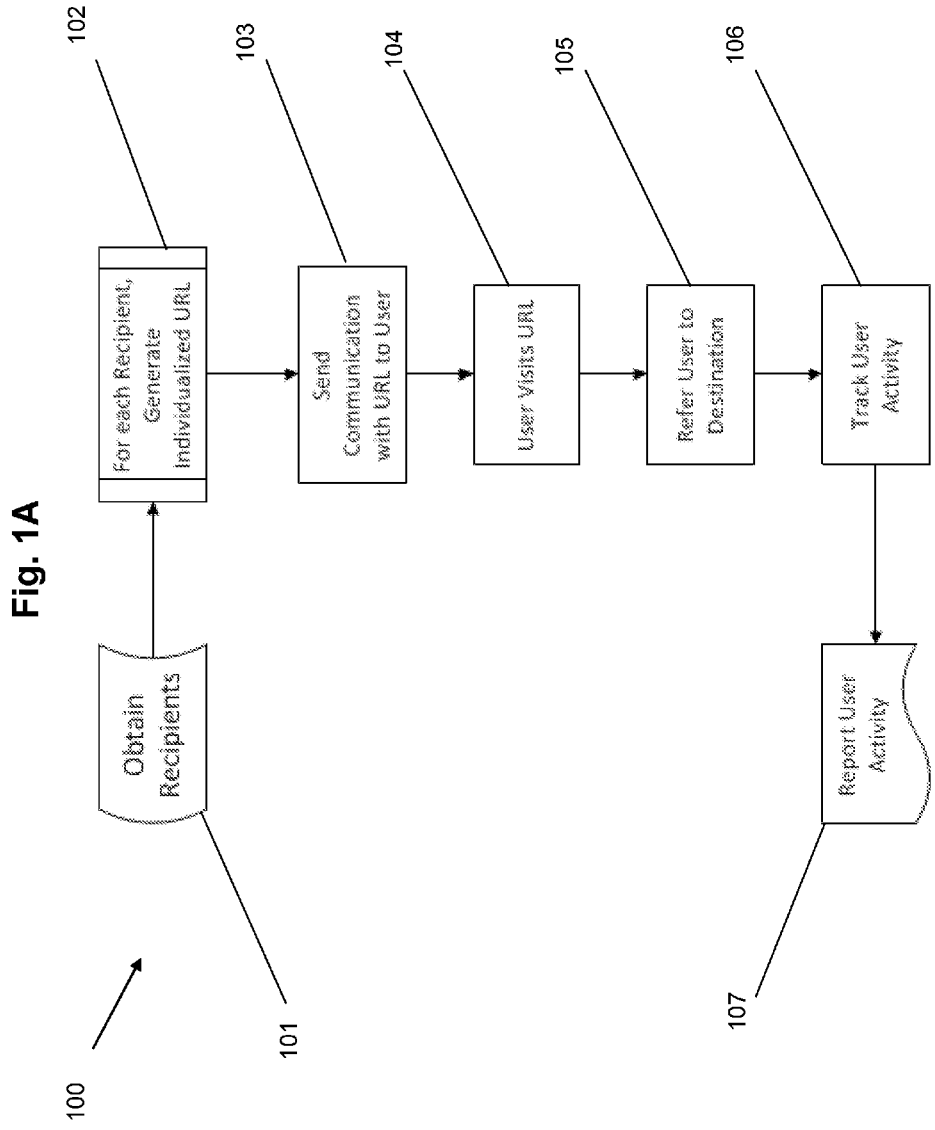

SYSTEM AND METHOD FOR GENERATING PERSONALIZED SHORT LINKS AND MONITORING ACTIVITY

PRIORITY

This application claims priority to and the benefit of U.S. Provisional Application No. 61/714,086, filed on Oct. 15, 2012 which is incorporated herein by reference.

BACKGROUND

Uniform Resource Locators (URLs) provide addresses of content available on the Internet to users. By typing in a URL into a browser, a user obtains content at the address associated with the URL. For example, a user accessing the URL http://www.uspto.gov through his or her browser will be taken to the website of the United States Patent and Trademark Office. As the Internet has evolved, URLs have dramatically increased in length as entities seek to include session information, parameters, queries, and other values within the URL. Additionally, the prevalence of mobile networking, social media, and tablet computing has created a consumer desire to use the shortest URLs possible. The aforementioned conflict created a need for an intermediate service that provides a short URL to a consumer which refers the user to the longer URL at the final destination. These URL shortening services include, for example, bit.ly, TinyUrl, and Google URL Shortener.

Nevertheless, current implementations suffer from the inability to provide individualized statistics based on consumer engagement through a marketing campaign that utilizes the shortened URL service. For example, current services cannot tell a business the user demographic information of individuals who visit a shortened URL nor can such current services link together the visit of a shortened URL with the purchase of an item offered at the final destination.

In addition, enterprises intending to track user activity on their websites use various types of tracking methods, such as, for example, cookies, web beacons, and script blocks. However, current tracking methods do not enable an enterprise to identify whether activity identified in these tracking methods generated from a user interacting with a marketing campaign, such as, for example, a user clicking a link within an email, and the current tracking methods do not enable an enterprise to determine which user is associated with the activity.

To solve this need, enterprises attempt to use persistent tracking objects that are stored on the user's computer or within the user's browser, such as, for example, a cookie. However, such locally stored tracking objects may be defeated by the user through deletion of such objects or through browser configurations. In addition, trending regulations, laws, and rules are attempting to stop this type of tracking activity without opt-in consent from the user.

Accordingly, there exists a need for a method and system that provides individualized shortened URLs to consumers and links together the usage of the shortened URL with subsequent Internet activity. In addition, there exists a need for a method and system that enables an enterprise to track user activity associated with the usage of the shortened URL with subsequent Internet activity that does not rely on locally stored tracking objects.

BRIEF DESCRIPTION OF THE DRAWINGS

FIG. 1A illustrates a flowchart of a method of tracking user activity through individualized shortened URLs according to at least one embodiment of the present disclosure.

DETAILED DESCRIPTION

Figure 1B:
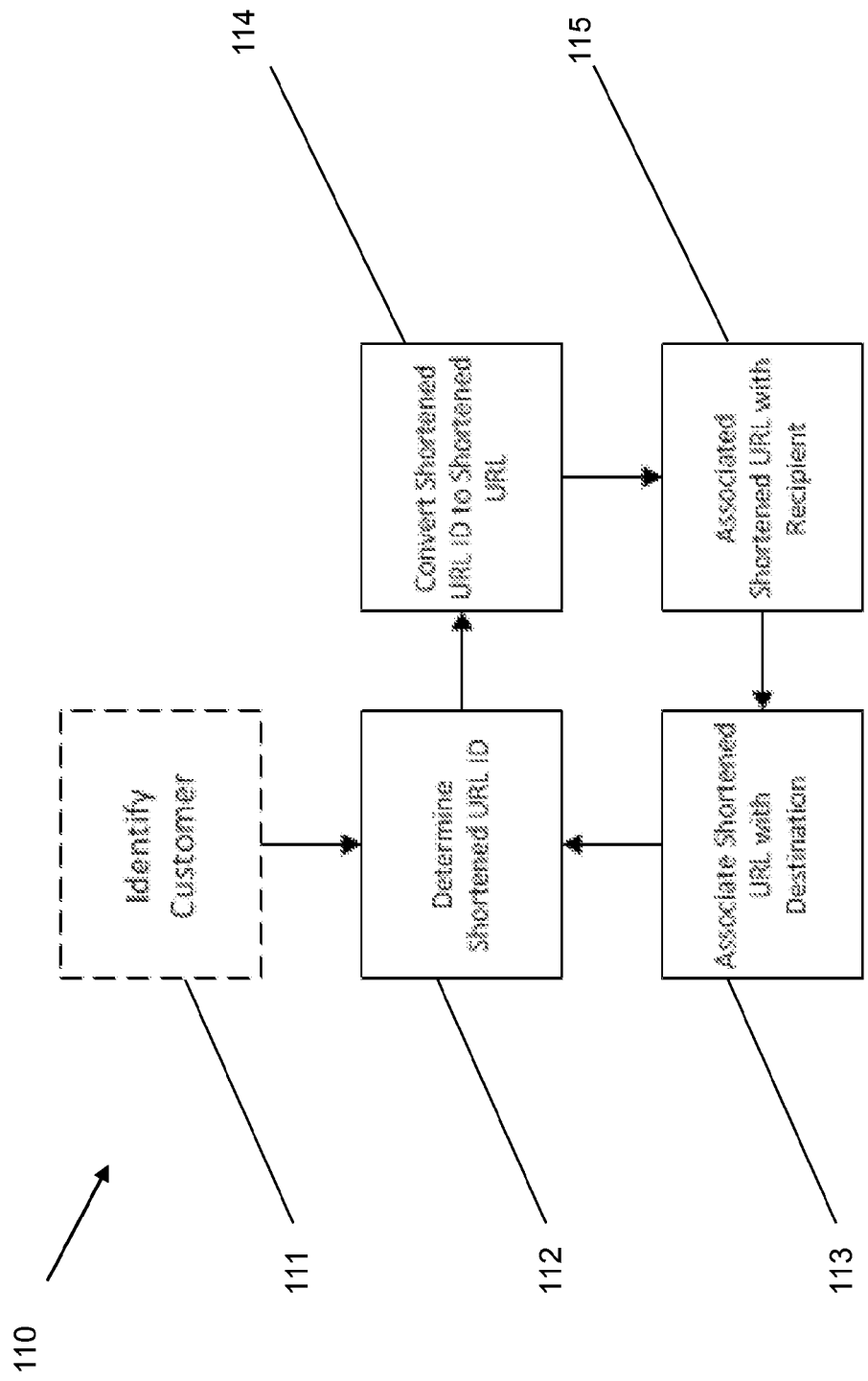
FIG. 1B illustrates a flowchart of a method of generating individualized shortened URLs according to at least one embodiment of the present disclosure.
Figure 1C:
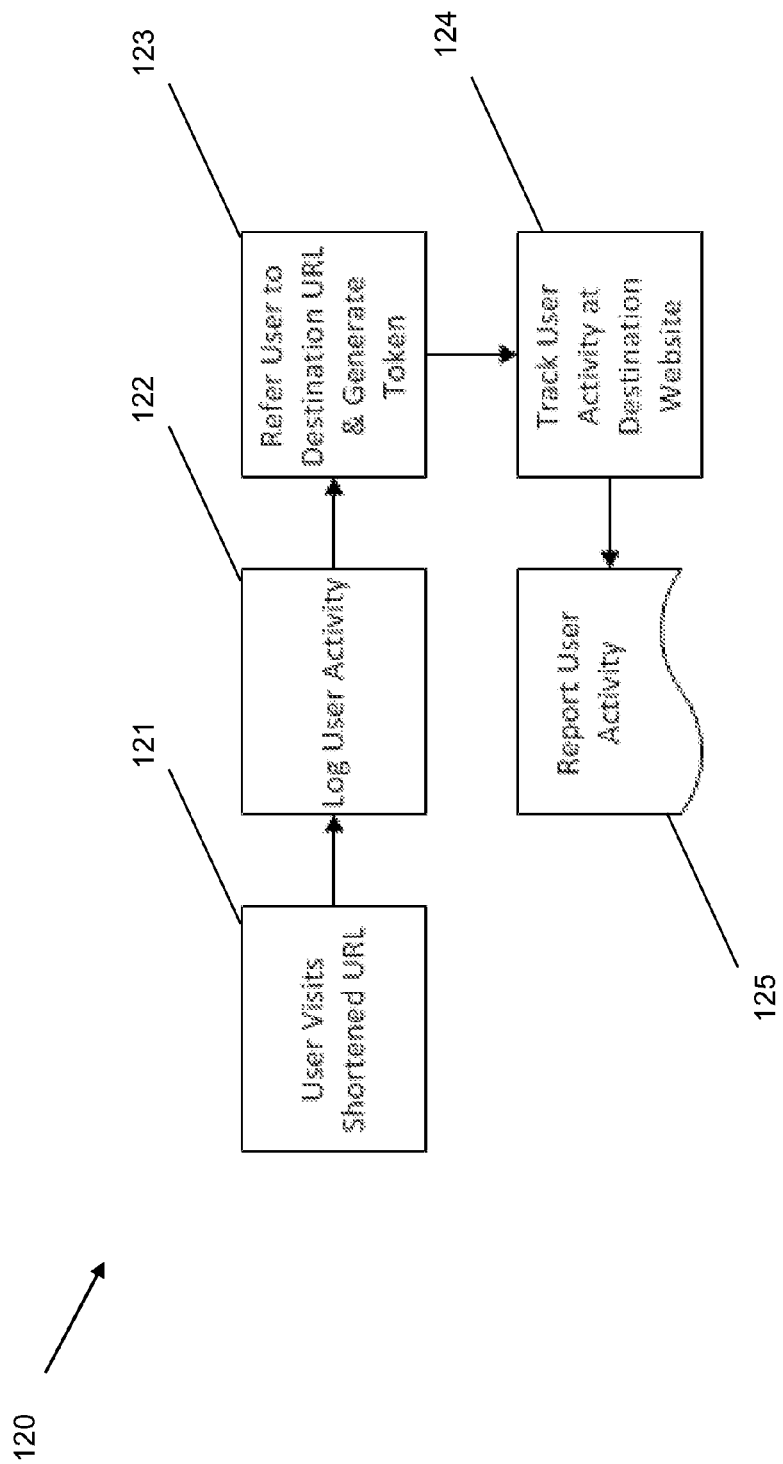
FIG. 1C illustrates a flowchart of a method of tracking user activity through individualized shortened URLs according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system may be written in languages such as Java, HTML, Python, C++, C#, or the ASP.Net programming language. However, one of skill in the art will appreciate that other languages may be used instead, or in combination with the foregoing.

According to at least one embodiment of the present disclosure, a method to generate individualized shortened URLs and subsequently monitor activity associated with such URLs is described in FIG. 1A. As shown in the method 100 disclosed in FIG. 1A, in at least one embodiment of the present disclosure, to generate shortened individualized URLs and subsequently track activity associated therewith, the steps of obtaining a list of recipients or users in step 101, generating individualized URL for each recipient in step 102, sending a communication to each user with an individualized shortened URL in step 103, the user visiting the individualized shortened URL in step 104, referring the user to the appropriate destination in step 105, tracking user activity in step 106, and reporting user activity in step 107 are disclosed.

In at least one embodiment of the present disclosure, the method 100 includes obtaining a list of recipients in step 101. A recipient, as used in this disclosure, includes, but is not limited to, an individual or group with metadata associated therewith, such as, for example, an email address, a cell phone number, a social media account, a physical address, or some other contact information in which communications may be sent. A recipient may also include simply an email address, cell phone number, social media account, physical address, or some other contact information in which communications may be sent. It should be appreciated that it is within the scope of this disclosure that a list of recipients may include one or many recipients.

In at least one embodiment of the present disclosure, in the step 101 of obtaining a list of recipients, a list of recipients is obtained for individualized shortened URL generation. In such an embodiment, the list defines the number of individualized shortened URLs that should be generated, and the recipients of each of the individualized shortened URL. In at least one embodiment of the present disclosure, the list of recipients is obtained from a database of information which stores customer and/or potential customer information. In such an embodiment, the database may include certain demographic information about such customers and/or potential customers. In such an embodiment, the database may include previously obtained tracking information associated with each customer and/or potential customer, such as, for example, individualized shortened URLs that the customer and/or potential customer visited, the number of times the customer and/or potential customer read, opened, or viewed a communication sent by the enterprise or through a marketing campaign.

In at least one embodiment of the present disclosure, the list of recipients obtained in step 101 is generated in furtherance of or obtained from a marketing campaign created for an enterprise. At least one advantage of the results of the method 100 is that the generation of individualized shortened URLs and subsequent tracking of activity associated therewith enables an enterprise to monitor activity of every recipient in a marketing campaign from the time in which the user opens the first communication. As such, in at least one embodiment of the present disclosure, the method 100 enables an enterprise to track activity, sales, clicks, opens, reads, web page views, and any other activity associated with the start of the marketing campaign. It should be appreciated that this information enables such enterprises to determine the actual success of the marketing campaign by collecting all activity from the point that a user first interacts with a communication generated in furtherance of the marketing campaign.

In at least one embodiment of the present disclosure, after the list of recipients is obtained in step 101, an individualized shortened URL is generated for each recipient in step 102. It should be appreciated that the list of recipients obtained in step 101 may be a feed or stream in which recipient addresses are being obtained over time and, therefore, individualized shortened URLs may be generated for each recipient in step 102 as such recipient's information is obtained in step 101. Thus, in at least one embodiment of the present disclosure, steps 101 and steps 102 may be performed simultaneously. Accordingly, it should be appreciated all of the steps of the method 100 may be performed as information comes into the method 100.

In at least one embodiment of the present disclosure, the method 100 includes the step 102 of generating an individualized shortened URL for each recipient. In at least one embodiment of the present disclosure, an individualized shortened URL is generated for each recipient according to the method described in FIG. 1B. In at least one embodiment of the present disclosure, the method 110 of generating an individualized shortened URL for each recipient includes the steps of identifying a customer in step 111, determining the shortened URL identifier in step 112, converting the shortened URL identifier to a shortened URL in step 113, associating the shortened URL with the recipient in step 114, associating the shortened URL with the appropriate destination in step 115, and then repeating steps 112, 113, 114, and 115 in the method 110 for each recipient.

One of ordinary skill in the art will appreciate that a URL may include multiple parts: a domain name, a server name, an address, a scheme name, a port number, a query string, and a fragment identifier. For example, the URL of http://www.uspto.gov/index.php?sessid=18393 includes the following parts:

Scheme Name: http://
Server Name: www
Domain Name: uspto.gov
Address: index.php
Query String: sessid=18393
Port: 80 (implied)

In this example, a web browser implies that the requested port number of the URL is 80 because that is the default port number associated with the HTTP scheme. Thus, although port 80 is not specifically defined in the URL in this example, most browsers will assume that the intended port number is 80.

In at least one embodiment of the present disclosure, it is advantageous for a URL in an individualized shortened URL to be as short as possible. In an exemplary embodiment, a shortened URL will include a scheme name, a short domain name, a short address, an implied port number by the browser, and no other elements. For example, an individualized shortened URL may be http://exct.ly/1. In this example, only the necessary elements of a URL are included in the individualized shortened URL in order to obtain the shortest URL possible.

URL shortening services today use a single domain name or a static number of domain names to provide shortened URLs to customers. In at least one embodiment of the present disclosure, in the step 111 of identifying a customer, one or many domain names may be associated with an individual customer or enterprise for the generation of individualized shortened URLs for such customer's recipients.

It should be appreciated that as a short URL service generates shortened URLs, the length of the shortened URL gradually increases because of the manner in which shortened URLs are generated. In at least one embodiment of the present disclosure, by associating a specific domain name to an individual customer or enterprise, the length of individualized shortened URLs generated for an enterprise may be controlled by such enterprise. It should be appreciated that the enterprise may delete previously created individualized shortened URLs or alter the destination in which individualized shortened URLs address.

For example, the enterprise ExactTarget may be associated with the domain name exct.ly. In this example, when individualized shortened URLs are generated for ExactTarget, such URLs use the domain name exct.ly.

In at least one embodiment of the present disclosure, the method 110 includes the 112 of determining a shortened URL identifier. In at least one embodiment of the present disclosure, to identify the shortened URL identifier in step 112, a key is selected. Keys, as used in this disclosure, may refer to a base 36, base 62, numeric, alphanumeric, or other sequence of characters acceptable to be used in a URL. In at least one embodiment of the present disclosure, to determine what key should be used in the shortened URL identifier, multiple methods may be used, such as, for example, generating a hash function, generating a random number, incrementing a number in a sequence, or other method.

In an exemplary embodiment, the shortened URL identifier identified in step 112 is generated by using a base 62 key that increments the value of the last base 62 key used in the previously generated shortened URL. In such an embodiment, the URL identifier is as short as possible because no characters are added as might occur if a random number in a range is used or a hashing function is used. For example, in the event that the previously generated shortened URL used the shortened URL identifier of '1', then the next shortened URL identifier to be used is '2'. In an exemplary embodiment, the shortened URL identifier may be reset so as to allow the enterprise to start the sequence over and, therefore, generate the shortest URLs possible. In such an embodiment, the enterprise may select to reset the shortened URL in the event that the enterprise is starting a new marketing campaign and/or the previously generated individual shortened URLs no longer are relevant.

In at least one embodiment of the present disclosure, the method 110 includes the step of converting a shortened URL identifier to a shortened URL in step 113. In at least one embodiment of the present disclosure, to convert the shortened URL identifier identified in step 112 to a shortened URL, the shortened URL identifier is appended to a domain name. In an exemplary embodiment, the domain name used is the domain name of the customer identified in step 111. In an exemplary embodiment, the domain name is a short domain name in order to keep the length of the shortened URL as short as possible.

For example, in the event that the shortened URL identifier determined in step 112 is 'C6f', and the domain name used for shortened URLs is 'exct.ly', then the shortened URL generated is 'http://exct.ly/C6f' in step 113. In this example, the 'http://' portion of the shortened URL corresponds to the fact that the shortened URL generated in this step 113 is associated with the HTTP protocol. It should be appreciated that it is within the scope of the present disclosure to generate shortened URLs for any protocol, such as, for example, FTP, HTTPS, SFTP, FTPS, and other protocols. For example, the shortened URL describe in this example could be associated with the FTP protocol by changing 'http://' to 'ftp://' and, therefore, generating the shortened URL of 'ftp://exct.ly/C6f'.

In this example, a port number is not associated with the shortened URL. As discussed above, in the event that a port number is not associated with a shortened URL, most browsers will assume that the default port number is to be used. As such, in this example, the 'http://' portion of the shortened URL identifies that the HTTP protocol is to be used and, therefore, most browsers associate the port number of '80', the default port number associated with the HTTP protocol. In at least one embodiment of the present disclosure, a port number may be added to the shortened URL, such as, for example, port 8080, therefore generating the shortened URL in this example of 'http://exct.ly/C6f: 8080'.

In at least one embodiment of the present disclosure, the method 120 includes the step of associating the shortened URL with a recipient in step 114. In at least one embodiment of the present disclosure, associating the shortened URL with a recipient in step 114 includes identifying a single recipient in a list of recipients to associate with the shortened URL to create an individualized shortened URL. In an exemplary embodiment, the recipient is identified from the list of recipients obtained in step 101 of the method 100.

In at least one embodiment of the present disclosure, the association of the shortened URL to the recipient in step 114 is stored in a storage medium, such as, for example, a database or a file. In at least one embodiment of the present disclosure, the association may include, but is not limited to, the e-mail address of the recipient, the name of the recipient, or a value that identifies the recipient. In at least one embodiment of the present disclosure, the shortened URL stored may include, but is not limited to, the entire shortened URL or the shortened URL identifier. In at least one embodiment of the present disclosure, storing the association of the shortened URL to the recipient enables the ability to track user activity in the event that the recipient visits the shortened URL. In at least one embodiment of the present disclosure, in the event that the recipient visits the shortened URL, the system can correlate that the shortened URL was visited by the recipient. In at least one embodiment of the present disclosure, the shortened URL is sent to the recipient through a marketing campaign in an email, SMS, or other communication individualized for the recipient. Therefore, it should be appreciated that the system may correlate that the recipient visited the individualized shortened URL.

In at least one embodiment of the present disclosure, the method 110 includes the step of associating the individualized shortened URL with a destination in step 115. In at least one embodiment of the present disclosure, a shortened URL redirects a user visiting the individualized shortened URL to another location. For example, a user visiting the shortened URL of 'http://exct.ly/C6f' described above is redirected to the destination associated with that shortened URL. In this example, the destination associated with the URL may be 'http://www.exacttarget.com/long/url/index.html'. In this example, the user will be redirected to 'http://www.exacttarget.com/long/url/index.html' when the user visits the URL of 'http://exct.ly/C6f'.

In at least one embodiment of the present disclosure, the redirection associated with the individualized shortened URL is assigned in step 115. In such an embodiment, the redirection is a destination URL that will be visited in the event that the individualized shortened URL is visited. In an exemplary embodiment, the destination URL is enabled to track visitors to the destination URL. In at least one embodiment of the present disclosure, the association between the individualized shortened URL and the destination URL is stored in a database. In such an embodiment, in the event that a user visits the individualized shortened URL with a web browser, a webserver responds with an HTTP redirect that directs the user's web browser to the destination URL, the HTTP redirect being populated from the association within the database.

The redirection may occur through one of many ways, such as, for example, by including a 301, 302, or 307 redirect status in the HTTP header associated with the URL, by including meta redirect code in the website to instruct the browser to refresh the page and visit the destination URL, or by other redirection methods for HTTP, FTP, HTTPS, and other protocols. It should be appreciated that the redirection may be implemented through a variety of ways and in a variety of languages, such as, for example, Apache rewrite, refresh Meta tag, and/or Java, PHP, Perl, and Javascript. In at least one embodiment of the present disclosure, the redirection may be performed by presenting the user a webpage at the shortened URL with a link to the destination.

In at least one embodiment of the present disclosure, the steps 112, 113, 114, and 115 are repeated to generate individualized shortened URLs for each recipient in a customer list. In at least one embodiment of the present disclosure, the individualized shortened URLs are each different and associated with different recipients. It should be appreciated that it is within the scope of the present disclosure to create one or many individualized shortened URLs based on a recipient list. For example, in the event that an enterprise creates a marketing campaign to send emails with a link to the enterprise's website within each email, the enterprise may utilize the individualized shortened URL generating system. In this example, the enterprise identifies a list of recipients that the enterprise intends to send such communications, and the enterprise inputs the recipient list into the system. Then, the method 100 is executed and the method 110 is executed for each recipient in the recipient list. It is within the scope of the present disclosure that less than all recipients will receive an individualized shortened URL or that the same individualized shortened URL may be used for more than one recipient, such as, for example, the same individualized shortened URL may be used for all men aged between 25-28 years.

In at least one embodiment of the present disclosure, after the individualized shortened URLs are generated, the method 100 includes the step 103 of sending communications with the individualized shortened URLs to each recipient or user. In such an embodiment, a communication to each recipient is created that includes the individualized shortened URL. Communications may include, but are not limited to, emails, tweets, SMS messages, MMS messages, web communications, instant messages, QR codes included within print materials, print materials, and other forms of communicating with a recipient or user.

In at least one embodiment of the present disclosure, the communication created for each recipient in step 103 may be part of a marketing and/or sales campaign initiated for an enterprise. In such an embodiment, the marketing campaign may include a strategy by an enterprise to have the user click on the individualized shortened URL in order to sign up for a mailing list, send information to the enterprise, obtain a discount on an item for purchase, purchase an item, direct traffic to the enterprise's website, obtain a Facebook "Like" from the recipient, or any other marketing campaign directed to the recipient. In one example, the marketing campaign may include a desire on the enterprise to send all persons who have signed up for the enterprise's mailing list a discount on a widget for purchase on the website. In this example, by using the individualized shortened URL system, the enterprise is able to potentially determine the success of the marketing campaign by understanding which individuals visited such individual's shortened URLs within the communication, and, as described below, the enterprise can determine analytics information regarding which individuals purchased an item because of the marketing campaign.

In at least one embodiment of the present disclosure, the communications are sent to each recipient or user in step 103 through an enterprise email system, such as, for example, the enterprise email system provided by ExactTarget, Inc. and disclosed in the United States patent application titled "Dynamic content electronic mail marketing system and method" published as US20040215479. In at least one embodiment of the present disclosure, content included within communications sent to each user or recipient may include dynamic content, live content, static content, and other types of content generally included in communications to users. It should be appreciated that the individualized shortened URL may be a portion of the content included in a communication. For example, an enterprise that sends communications to its customers today that intends to include individualized shortened URLs may only need to replace links included within a communication with an individualized shortened URL. As described herein, it should be appreciated that this replacement may reduce the size of the communication.

In at least one embodiment of the present disclosure, the communications may take different forms depending on the recipient or user and/or a marketing campaign. In such an embodiment, a group of recipients or users may be sent communications through email while another group or recipients or users may be sent communications through MMS message, while a third group of recipients or users may be sent communications through social media. It should be appreciated that it is within the scope of the present disclosure to send various types of communications to various recipients or users.

In at least one embodiment of the present disclosure, the communications sent to each user or recipient in step 103 may include duplicative communications of different types of such users or recipients. In such an embodiment, a single user may receive an email communication, an SMS message, an MMS message, and other types of communications all as part of a marketing campaign. In at least one embodiment of the present disclosure, the method 100 may include sending multiple types of communications to an individual user in step 103. In such an embodiment, a user may receive multiple types of communications in order to try to increase the likelihood that the user clicks on the individualized shortened URL. In such an embodiment, each communication to the individual user, regardless of type, may include an identical individualized shortened URL or each communication to the individual user may include a unique individualized shortened URL. In an exemplary embodiment, each communication sent to the individual user will include a separate individualized shortened URL in order to provide more rich analytical information in the event that the user visits the individualized shortened URL included within any communication. As disclosed below, by including unique individualized shortened URLs in each communication sent to an individual user, an enterprise is able to determine which type of communication is more effective for the individual user.

For example, Bob has signed up for the newsletter of Company A and disclosed his cell phone number, email address, and Twitter handle to Company A. In this example, Company A may initiate a marketing campaign associated with Bob. Company A, at its option, may include multiple addresses for Bob to include in the marketing campaign (Twitter handle, cell phone number, email address). In one example, Company A may include Bob's Twitter handle and email address in the marketing and create communications to send to Bob at these addresses with links to the Company A website utilizing individualized shortened URLs. In this example, the method 100 generates individualized shortened URLs for each of Bob's addresses and with the Company A website as the address associated with each individualized shortened URL. The communications, therefore, sent to Bob as a result of this marketing campaign are a Twitter direct message with an individualized shortened URL directing Bob to the Company A website and an email message with a different individualized shortened URL directing Bob to the Company A website. In the event that Bob visits either individualized shortened URL, Company A will be able to determine which communication type (Twitter or email) Bob utilized and thereafter alter its marketing campaign to increase the likelihood that Bob will be engaged. In another example, Company A may choose to send the same individualized shortened URL to Bob through Twitter and email. In this example, in the event that Bob visits the individualized shortened URL, Company A will not be able to determine which communication method engaged Bob to visit the individualized shortened URL.

In at least one embodiment of the present disclosure, the method 100 includes the user visiting the individualized shortened URL included within a communication in step 104. A user may visit an individualized shortened URL included within a communication through multiple ways, such as, for example, clicking a link within a communication in a web browser, clicking a link in an email through an email client, selecting a link within an SMS or MMS message on a cell phone, or even manually typing in the individualized shortened URL in a web browser or mobile browser.

In at least one embodiment of the present disclosure, the individualized shortened URL is associated with a destination URL. In such an embodiment, when visiting the individualized shortened URL, the user is redirected to the destination URL in step 104. In at least one embodiment of the present disclosure, the enterprise managing the individualized shortened URLs may reuse individualized shortened URLs in order to keep the length of individualized shortened URLs at a minimum. As described herein, generating individualized shortened URLs for a specific domain name will eventually increase the length of the individualized shortened URLs at a rate that varies depending on the method used to generate individualized shortened URL identifiers in 112 of the method 110. For example, in the event that the individualized shortened URL identifiers are generated by counting, the length of the individualized shortened URLs will increase by one at each power of ten generated individualized shortened URL identifier. For example, in the event that the previously generated individualized shortened URL identifier is '999' for the domain exct.ly, then the length of that individualized shortened URL would be '18' (http://exct.ly/999). When determining the next individualized shortened URL identifier, the length of the individualized shortened URL will increase to '19' (http://exct.ly/1000).

Therefore, in at least one embodiment of the present disclosure, an enterprise may reuse or reset the individualized shortened URL identifier. In such an embodiment, the enterprise may reuse the individualized shortened URL identifier in the event that the previously created individualized shortened URL is stale. For example, an enterprise generating individualized shortened URLs for its customers to advertise a one-week sale may choose to reuse the individualized shortened URL identifiers associated with the individualized shortened URLs after the sale is over and, therefore, keep the length of individualized shortened URLs to a minimum.

In at least one embodiment of the present disclosure, the destination URL associated with each individualized shortened URL may be altered. An enterprise may choose to alter the destination URL associated with each individualized shortened URL in the event that a sale has expired, a coupon is no longer valid, and/or an advertisement is no longer relevant. In such an embodiment, the enterprise may select a different destination URL to associate with the individualized shortened URL. For example, in the event that an enterprise generated an individualized shortened URL to draw users to a three-week sale at the enterprise's website and three weeks has passed, the enterprise may choose to create a new landing page that apologizes to any visitor that the sale has ended but directs the visitor to a new sale. In this example, the individualized shortened URLs generated for communications sent in association with the three-week sale may be altered to be associated with the destination URL of the apology website. It should be appreciated that this practice will present users or recipients that visit the individualized shortened URL with relevant content as opposed to serving stale content in which the user or recipient is not interested.

In at least one embodiment of the present disclosure, the user is redirected or referred to a destination URL associated with the individualized shortened URL in step 105. In such an embodiment, the individualized shortened URL directs the user to a location that refers or redirects the user to the destination URL. In an exemplary embodiment, the individualized shortened URL directs the user to a web server that issues a 301 HTTP redirect which automatically informs the user's web browser to visit the destination URL. It should be appreciated that the redirection may occur through one of many ways, such as, for example, by including a 301, 302, or 307 redirect status in the HTTP header associated with the URL, by including meta redirect code in the website to instruct the browser to refresh the page and visit the destination URL, or by other redirection methods for HTTP, FTP, HTTPS, and other protocols. It should be appreciated that the redirection may be implemented through a variety of ways and in a variety of languages, such as, for example, Apache rewrite, refresh Meta tag, and/or Java, PHP, Perl, and Javascript. In at least one embodiment of the present disclosure, the redirection may be performed by presenting the user a webpage at the shortened URL with a link to the destination.

In an exemplary embodiment, the user is redirected to a destination URL that creates a tracking object in order to track user activity in step 105. In such an embodiment, the destination URL may include tracking information passed as a parameter in the URL in order to identify a user session based on a unique user identifier. In an exemplary embodiment, the website at the destination URL may use the token passed in the destination URL to identify a user session and create a locally stored tracking object associated with the user. Locally stored tracking objects may include, but are not limited to, standard HTTP cookies, local shared objects, Silverlight isolated storage, storing cookies in RGB values of auto-generated, force-cached PNGs using HTML5, web history cookies, HTTP ETag cookies, Web cache cookies, caching through the windows.name parameter, Internet Explorer UserData storage, and various HTML5 storage objects.

In an exemplary embodiment, the user is directed to a destination URL where the destination URL is a personalized URL for the user in step 105. In such an embodiment, the destination URL includes a token to identify the user upon visiting the destination URL. In such an embodiment, a web server presents content to the user at the destination URL wherein one or more interactive elements of the content include token information to further identify the user upon interacting with the content. In the event that the user clicks a link within the content, the web server obtains the token information to associate the activity directly to the user. When the web server presents content at the URL included in the link, the web server dynamically generates interactive elements of the content to preserve the token-based information to further identify the user in the event that the user interacts with the content.

For example, a user visits the individualized shortened URL and is redirected to the destination URL of 'http://www.uspto.gov/?sessid=hA8nV'. In this example, the web server responding to this request identifies that the user is visiting the destination URL based on the '?sessid' token value. In this example, when the web server presents content to the user, the web server includes the '?sessid' token value in interactive elements of the content. For example, the content may include a link to an "About Us" page which is available at 'http://www.uspto.gov/About.html'. In this example, the web server will generate the link to include the token-based information to identify the user in the event that the user clicks the link. In basic HTMl, this link may be presented as the following:

<a href=http://www.uspto.gov/About.html?sessid=hA8nV>About Us</a>

Thus, in this example, in the event that the user clicks on the "About Us" link, the web server associates this activity with the user based on the token-based information passed by the user when clicking on the link. It should be appreciated that this is only one example of the type of interactive content which may include token-based information. Other types of interactive content may include, but are not limited to, shopping carts, forms, links, social-media modules (i.e., Facebook "Like", Twitter "Follow", LinkedIn "Like", Google Plus "+1", etc), and other types of interactive content.

In at least one embodiment of the present disclosure, the tracking object created in step 105 enables the enterprise to track user activity through the entirety of the user's session in step 106. In an exemplary embodiment, the locally stored tracking object created to track user activity when the user is redirected to the destination URL in step 105 provides tracking data that enables an enterprise to evaluate the success of a marketing campaign from sending the communication through purchase or a product, using a coupon, signing up for more information, or other activity at the destination URL. It should be appreciated that utilizing an individualized shortened URL provides functionality currently unable when utilizing shortened URLs by enabling an enterprise to accurately determine success of a marketing campaign by understand how many users click a link within a communication and thereafter interact with the website in which the user is redirected. It should be appreciated that the additional analytical information enables the enterprise to identify the most relevant communication types (i.e., Twitter, email, SMS, MMS, etc.) by determining success of a marketing campaign from clicks within the communication through the entire session at the destination URL.

For example, the system and method described herein enables an enterprise to track and report on every aspect of a marketing campaign. In the example used above, Company A sends a Twitter communication and an email with individualized shortened URLs to Bob. In this example, Bob opens up the email in his mail client, clicks on the individualized shortened URL which redirects Bob to Company A's website where Company A is displaying an advertisement for a discounted product. Bob interacts with the website to purchase the discounted product.

In this example, when Bob clicks on the individualized shortened URL in his email client, the individualized shortened URL redirects Bob to a destination URL associated with the Company A website that also includes a token-based session identifier in the URL. Then, the destination URL establishes a cookie in Bob's web browser associated with the token-based session identifier. As Bob navigates through the Company A website, Company A utilizes the cookie to connect all activity associated with Bob on the Company A website. In this example, by establishing the cookie through a token-based session identifier when Bob clicked the individualized shortened URL, Company A is able to monitor Bob's activity from the point in which Bob clicked on the individualized shortened URL all the way to the point in which Bob purchased the discounted product. Thus, Company A can reliably report that by sending the communication to Bob with the individualized shortened URL, Company A directly realized revenue associated with the sale of the discounted product.

In at least one embodiment of the present disclosure, the tracking activity associated with one or more individualized shortened URLs generated in the method 100 may be reported in step 107. In such an embodiment, by utilizing shortened URLs and tracking activity throughout the entirety of user engagement within a marketing campaign. The report generated in step 107 may include information regarding the number of visits to generated shortened URLs, the percentage of engagement of shortened URLs, the number of purchases of products associated with visits to shortened URLs, the percentage of recipients who purchased a product associated with visits to shortened URLs, the types of activity at the destination URL associated with visits to shortened URLs, and other activity.

It should be appreciated that it is within the scope of the present disclosure to utilize the individualized shortened URLs system and methods described herein to report on user activity from the point of communication all the way through the user's activity at any destination URL associated with an individualized shortened URL. By using an individualized shortened URL within a communication to a user, an enterprise may uniquely identify a user upon receiving a web request from the user for the individualized shortened URL. For example, an individualized shortened URL may enable an enterprise to, with reasonable certainty, verify that a particular consumer has visited a website even if the consumer has disabled cookies or other tracking objects in his or her browser. Upon visiting the website, the enterprise may insert a cookie, tracking object, or use session-side tracking methods to enable the enterprise to track the entirety of the consumer's activity on the website, all originating from the web request for the individualized shortened URL. In this example, the enterprise is still able to track activity even if the consumer clears tracking objects from his or her web browser prior to visiting the individualized shortened URL because the enterprise maintains the relationship between the consumer and the individualized shortened URL. Further, the enterprise is able to gather analytics that directly identify the success or failure of a marketing campaign because the enterprise may track activity, for example, all the way from opening an email to purchasing a product on a website.

It should be appreciated that by combining the individualized shortened URL system and method with other marketing techniques, the enterprise is able to provide analytic information associated with marketing campaigns that is currently not able to be captured when utilizing shortened URLs. By using individualized shortened URLs, the enterprise may capture analytics specifically tied to an individual whereas today's shortened URL services only enable an enterprise to capture aggregate information about the repeated use of a single shortened URL.

It should be appreciated that the system and method described herein for the use of individualized shortened URLs may be combined with other systems and methods associated with marketing campaigns and that the system and method described herein is a supplement to existing marketing campaigns that enables marketers to send shorter communications. Platforms, such as enterprise email marketing solutions, dynamic content, live content, QR codes, and other marketing tools, may enable marketers to track and measure the effectiveness of their campaigns.

Figure 2:
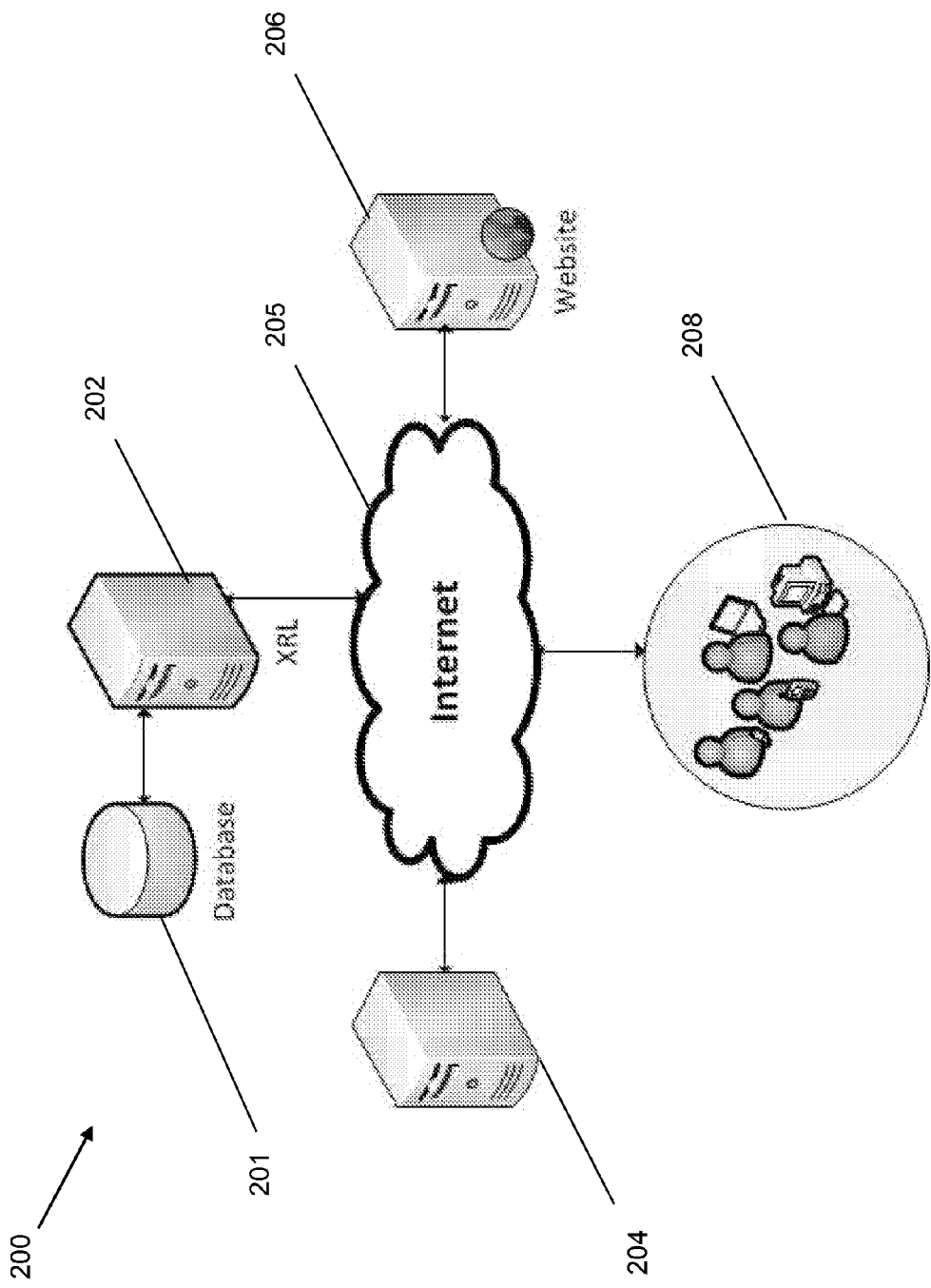
FIG. 2 illustrates the architecture of a system for generating individualized shortened URLs and tracking user activity according to at least one embodiment of the present disclosure.

Referring now to FIG. 2, it is shown components in architecture of a system to generate individualized shortened URLs and track user activity according to at least one embodiment of the present disclosure. In at least one embodiment of the present disclosure, the system 200 includes a database 201, an XRL server 202, a tracking environment 204, a network 205, a website 206, and one or more user devices 208. As used in the present disclosure, the network 205 may include, but is not limited to, WAN, the Internet, LAN, mobile network, and any computer-based network. As used in the present disclosure, one or more user devices 208 may include, but are not limited to, cell phones, smartphones, laptops, desktops, tablets, and other devices.

In at least one embodiment of the present disclosure, the database 201 stores information related to audience members in which communications may be sent in a marketing campaign. In such an embodiment, the database may store demographic information, contact information, and other information about audience members that would enable an enterprise to decide which audience members in a database may be interested in a specific product, coupon, service, offer, or other marketing activity based on such demographic information. For example, the database 201 may store age, gender, and occupation as demographic information. A marketer interested in providing an offer only to females in the age range of 18-24 could use the demographic information to determine an appropriate audience. In this example, the database 201 also stores contact information for each user, such as, for example, a cell phone number, Facebook account, or email address.

In at least one embodiment of the present disclosure, an enterprise intending to create individualized shortened URLs may create individualized shortened URLs as part of a marketing campaign. In such an embodiment, the enterprise may only be interested in sending communications to a subset of individuals stored within the database 201. In such an embodiment, the enterprise may use demographic information stored in the database 201 about individuals to identify the types of individuals that the enterprise intends to engage with the marketing campaign. In at least one embodiment of the present disclosure, the enterprise may choose one or more communication types based on contact information stored in the database 201 about the individuals.

In at least one embodiment of the present disclosure, the database 201 is electronically coupled, such as, for example, through a computer network, to an XRL server 202. The XRL server 202 may include a single server, a plurality of servers, a set of disparate servers providing an XRL service, or other configurations in which individualized shortened URLs may be created and distributed as set forth in the present disclosure. In at least one embodiment of the present disclosure, the XRL server 202 creates individualized shortened URLs based on the requests of an enterprise. In such an embodiment, the XRL server 202 stores the current shortened URL identifier and generates individualized shortened URLs through the methods described herein. In such an embodiment, the XRL server 202 may store individualized shortened URLs in the database 201 and may store the association between individuals and the individualized shortened URLs in the database 201.

In at least one embodiment of the present disclosure, the XRL server 202 stores an association between the individualized shortened URLs and individuals stored in the database 201. In at least one embodiment of the present disclosure, the XRL server 202 communicates with the database 201 to store the association between each individual and any individualized shortened URLs created for the individual.

In at least one embodiment of the present disclosure, the XRL server 202 communicates with the database 201 to store each destination URL associated with each individualized shortened URL. In the event that one or more users 208 visits an individualized shortened URL, the XRL server 202 receives the request from the one or more users 208 over the network 205 and thereafter redirects the one or more users to a website 206 in the event that the destination URL is associated with the website 206.

In at least one embodiment of the present disclosure, the XRL server 202 provides an XRL service through the network 205 to an enterprise for requests to generate individualized shortened URLs. The XRL service provided may include a RESTFul architecture, an application programming interface, a "Big" web service, or any other interactive service to make requests of a third party over a network 205. In at least one embodiment of the present disclosure, the XRL service may require password authentication, two-factor authentication, and/or may include security mechanisms to protect the XRL server 202 and the XRL service from anonymous users, non-paying customers, third parties, and/or malicious users intending to generate individualized shortened URLs to malicious sites or benefit from the service.

In at least one embodiment of the present disclosure, the system 200 includes a tracking server 204. The tracking server 204 obtains tracking information from one or more tracking objects generated through the one or more user devices 208 interacting with the individualized shortened URLs and subsequent visits to the website 206. In at least one embodiment of the present disclosure, the tracking server 204 may monitor activity through a third-party cookie. In another embodiment, the website 206 may pass information the tracking server 204 based on first-party cookies, session-tracking elements, or other server-side tracking utilities. In an exemplary embodiment, the XRL server 202 passes information related to activity associated with each individualized shortened URL to the tracking server 204. In such an embodiment, the tracking server 204 stores tracking information and may generate reports to an enterprise detailing analytics related to a marketing campaign that uses individualized shortened URLs, analytics associated with a specific individual's use of individualized shortened URL, and other information that may assist marketers in evaluating marketing activities.

Figure 3:
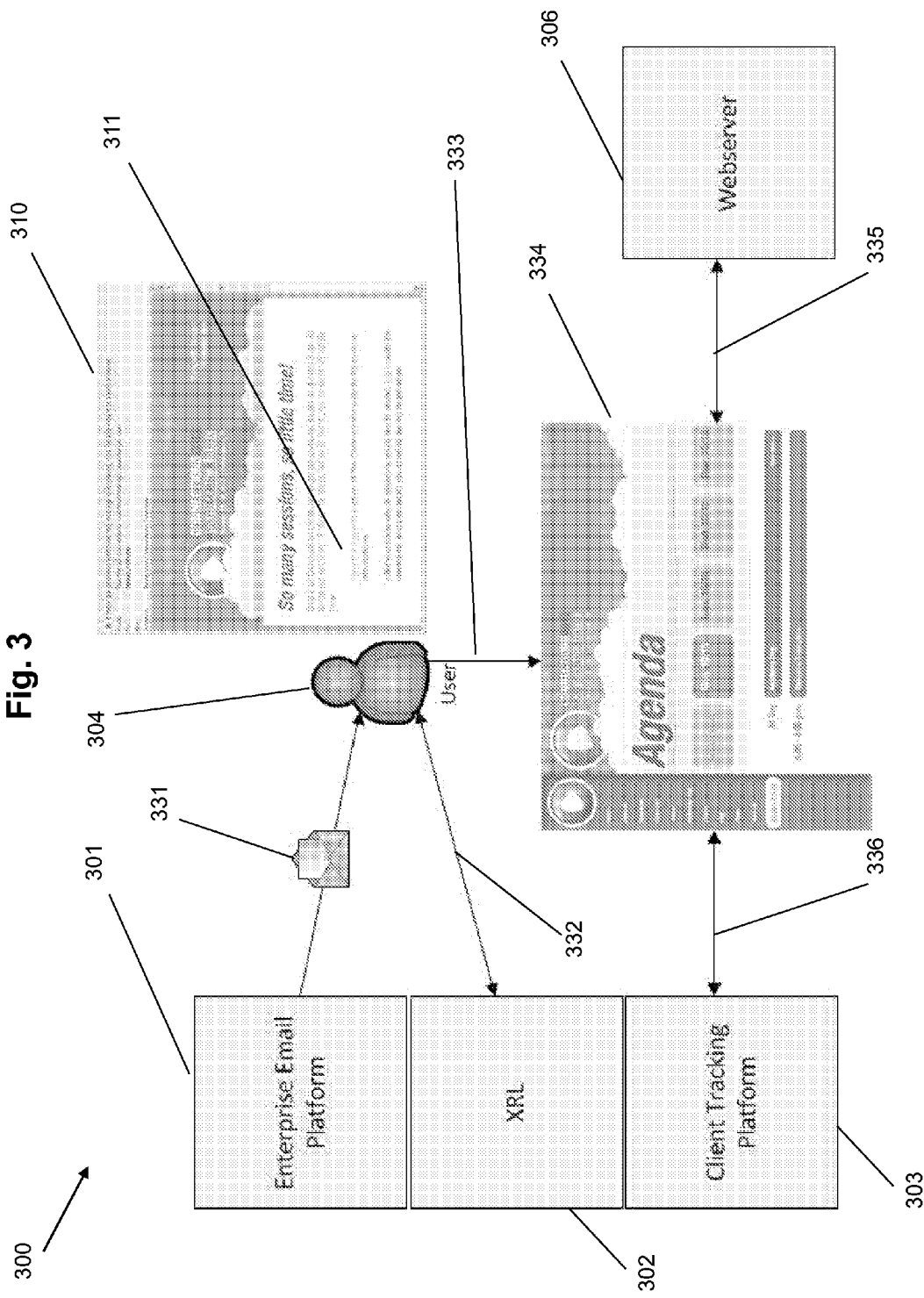
FIG. 3 illustrates a flowchart and architecture of a system and method for generating individualized shortened URLs and tracking user activity according to at least one embodiment of the present disclosure.

Referring now to FIG. 3, it is shown a flowchart and architecture diagram of a system and method for generating individualized shortened URLs and tracking subsequent user activity according at least one embodiment of the present disclosure. As shown in FIG. 3, the system 300 includes an enterprise email platform 301, an XRL service 302, a client tracking platform 303, a user 304, and a webserver 306. In such an embodiment, the enterprise email platform 301, the XRL service 302, the client tracking platform 303, the user 304, and the webserver 306 are all electronically coupled through a network, such as, for example, the Internet.

In at least one embodiment of the present disclosure, the XRL service 302 generates individualized shortened URLs for a user 304 based on the request of an enterprise. In such an embodiment, the XRL service 302 is configured to respond to HTTP requests for each individualized shortened URL, and the XRL service 302 redirects any request to an individualized shortened URL to an associated destination URL, such as, for example, a destination URL that directs traffic to the webserver 306.

In at least one embodiment of the present disclosure, the XRL service 302 generates an individualized shortened URL for the user 304 based on a request from an enterprise. In such an embodiment, the enterprise email platform 301 creates an email 331 to send to the user 304 that includes the individualized shortened URL. In such an embodiment, the email 331 may include content of various types, such as, for example, text, picture, video, dynamic content, live content, and other content. In at least one embodiment of the present disclosure, the individualized shortened URL within the email 331 is presented as a link.

In at least one embodiment of the present disclosure, the user 304 receives the email 331 sent from the enterprise email platform 301. In such an embodiment, the user 304 views the email 331 through any email client, such as, for example, Gmail, Outlook, or Outlook Express. In at least one embodiment of the present disclosure, the user 304 views the email 331 in the email client to view the email content 310. As shown in FIG. 3, the email content 310 may include text, images, links, and other content. In the example shown in FIG. 3, the email content 310 advertises a conference and requests the user 304 to visit a link 311 to set a schedule for the conference.

In at least one embodiment of the present disclosure, the email content 310 includes an individualized shortened URL as a link, such as, for example, the link 311 shown in FIG. 3. In such an embodiment, the user 304 clicks the link 311. In at least one embodiment of the present disclosure, the link 311 is an individualized shortened URL. For example, the individualized shortened URL presented as the link 311 may be a reference to an enterprise website to schedule activities at a conference that is specific for the user 304. In this example, the URL may be 'http://exct.ly/29kHa'.

In at least one embodiment of the present disclosure, the user 304 clicks the link 311. In such an embodiment, the user's device performs a GET request 332 to the XRL service 302 for the individualized shortened URL. In this example, the GET request would request the URL 'http://exct.ly/29kHa' from the XRL service 302. In such an embodiment, the XRL service 302 redirects the user's device 304 to the destination address associated with the individualized shortened URL. The redirection may be performed through any redirection method, such as, for example, an HTTP 301 redirect, meta refresh code, or other redirection method.

In at least one embodiment of the present disclosure, the user 304 is redirected to the destination URL at the webserver 306. In such an embodiment, the user 304 generates a GET request for the destination URL 335 at the webserver 306. In such an embodiment, the webserver 306 responds by presenting the user with the webpage 334. In an exemplary embodiment, the destination URL includes a session identifier or token-based tracking object to identify the user 304 to the webserver 306 upon visiting the destination URL. In such an embodiment, by including the session identifier or token-based tracking object, the webserver can correlate the user 304 clicking the link 311 with the user 304 visiting the webserver 306. In an exemplary embodiment, the user 304 visits the webserver 306, and the webserver 306 generates a tracking cookie to be placed on the user's device 304. In such an embodiment, the tracking cookie is linked to the session identifier or token-based identifier from the destination URL so that the webserver 306 may correlate the user 304 clicking the link 311 with all activity the user 304 performs on the webserver 306.

In at least one embodiment of the present disclosure, the webserver 306 presents the user 304 with the webpage 334. In an exemplary embodiment, the webpage 334 includes a variety of content associated with the purpose for sending the user 304 the initial email 331 in the marketing campaign. For example, the webpage 334 may include a discounted product, a coupon, an offer, or other advertising material that was offered to the user 304 through the email content 310 within the email 331.

In an exemplary embodiment, the webpage 334 also includes tracking objects that send activity information through a connection 336 to the client tracking platform 303. In an exemplary embodiment, the connection 336 occurs when the webpage 334 present third-party content from the client tracking platform 303 to the user 304. In such an embodiment, the user 304 and the client tracking platform to transfer tracking information, such as, for example, through establishing a cookie or other locally stored tracking object. In such an embodiment, the user 304 communicates with the webserver 306 and the client tracking platform 303 when interacting with the webpage 334. In at least one embodiment of the present disclosure, content is presented to the user 304 in the webpage 334 from the client tracking platform 303 and the webserver 306.

It should be appreciated that the enterprise email platform 301, the XRL service 302, and the client tracking platform 303 may all reside within the same infrastructure and be operated by the same enterprise. It should be appreciated that it is within the scope of the present disclosure that the webserver 306 is also operated by such enterprise. However, in an exemplary embodiment, the webserver 306 is operated by a client of the enterprise, and the enterprise provisions the XRL service including tracking information for the client's use.

It should be appreciated that although FIG. 3 shows an example in which email is the communication type, it is within the scope of the present disclosure that the system 300 includes other communication types, such as, for example, social media messaging, SMS, MMS, and other communications.

While the description above refers to particular embodiments of the present invention, it will be understood that many modifications may be made without departing from the spirit thereof. The accompanying concepts are intended to cover such modifications as would fall within the true scope and spirit of the present invention. The presently disclosed embodiments are therefore to be considered in all respects illustrative and not restrictive, the scope of the invention being indicated by the appended concepts, rather than the foregoing description, and all changes which come within the meaning and range of equivalency of the concepts are therefore intended to be embraced therein.

What is claimed is:

1. A computer-implemented method performed by a user activity tracking system based upon shortened Uniform Resource Locators (URLs), the method comprising:
receiving a request for an individualized shortened first URL, the individualized shortened first URL including a unique identifier identifying a first recipient from among a plurality of recipients;
causing a computing device associated with the first recipient to create and store a locally-stored tracking object;
receiving a request for a second URL;
determining that the request for the second URL originated from the first recipient;
associating an activity performed at the second URL with the locally-stored tracking object; and
based upon the activity being associated with the locally-stored tracking object, providing a report describing a web activity generated by the first recipient at the second URL.

2. The method of claim 1, wherein the providing the report of the web activity generated by the first recipient is for web activities at a plurality of URLs, the plurality of URLs comprising the second URL.

3. The method of claim 1, further comprising:
receiving web activity information about a user's activity with respect to a first marketing campaign separate and distinct from a second marketing campaign associated with the individualized shortened first URL;
wherein the report indicates an effectiveness of the first marketing campaign with respect to the first recipient.

4. The method of claim 3, wherein the effectiveness comprises a relative effectiveness of the first marketing campaign with respect to the first recipient relative to the second marketing campaign with respect to the first recipient.

5. The method of claim 1, further comprising:
subsequent to a time period for a marketing campaign associated with a destination URL for the individualized shortened first URL, generating a new destination URL for the individualized shortened first URL; and
associating the new destination URL with the individualized shortened first URL in place of the destination URL.

6. The method of claim 1, further comprising:
receiving a request for an individualized shortened third URL, the individualized shortened third URL including the unique identifier; and
associating an activity performed at a destination URL associated with the individualized shortened third URL with the locally-stored tracking object;
wherein the report describes a web activity generated by the first recipient at the third URL or a destination address associated with the third URL.

7. The method of claim 1, further comprising:
redirecting the request for the individualized shortened first URL to a destination URL associated with the first URL; and
associating an activity performed at the destination URL with the locally-stored tracking object;
wherein the report describes a web activity generated by the first recipient at the destination URL.

8. The method of claim 1, wherein the report comprises a description of a web activity generated by the first recipient at a third URL distinct from the first URL and the second URL.

9. The method of claim 8 wherein the third URL is for a web asset controlled by an entity distinct from an entity that controls the first URL and the second URL.

* * * * *